US011580955B1

United States Patent
Meng et al.

(10) Patent No.: US 11,580,955 B1
(45) Date of Patent: Feb. 14, 2023

(54) SYNTHETIC SPEECH PROCESSING

(71) Applicant: Amazon Technologies, Inc., Seattle, WA (US)

(72) Inventors: Yixiong Meng, San Jose, CA (US); Roberto Barra Chicote, Cambridge (GB); Grzegorz Beringer, Gdansk (PL); Zeya Chen, Lynnwood, WA (US); Jie Liang, Bellevue, WA (US); James Garnet Droppo, Carnation, WA (US); Chia-Hao Chang, Shoreline, WA (US); Oguz Hasan Elibol, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 140 days.

(21) Appl. No.: 17/218,740

(22) Filed: Mar. 31, 2021

(51) Int. Cl.
G10L 13/08 (2013.01)
G10L 13/027 (2013.01)
G10L 15/06 (2013.01)
G10L 13/033 (2013.01)
G10L 19/008 (2013.01)
G10L 13/047 (2013.01)

(52) U.S. Cl.
CPC ............ G10L 13/08 (2013.01); G10L 13/027 (2013.01); G10L 13/0335 (2013.01); G10L 13/047 (2013.01); G10L 15/063 (2013.01); G10L 19/008 (2013.01)

(58) Field of Classification Search
CPC ............................... G10L 13/08; G10L 13/00
See application file for complete search history.

(56) References Cited

U.S. PATENT DOCUMENTS

| 7,617,105 | B2* | 11/2009 | Shi | G10L 13/10 |
| | | | | 704/260 |
| 11,410,684 | B1* | 8/2022 | Klimkov | G10L 25/78 |
| 11,430,434 | B1* | 8/2022 | Milstein | G10L 15/30 |
| 2014/0257816 | A1* | 9/2014 | Morinaka | G10L 13/02 |
| | | | | 704/260 |
| 2021/0375290 | A1* | 12/2021 | Hu | G10L 13/04 |
| 2022/0246132 | A1* | 8/2022 | Zhang | G10L 13/10 |

FOREIGN PATENT DOCUMENTS

| CN | 112863483 A | * | 5/2021 | | |
| CN | 112002348 B | * | 12/2021 | ............ | G10L 25/24 |
| CN | 109545243 B | * | 9/2022 | ............ | G10L 15/02 |
| JP | 2015169700 A | * | 9/2015 | | |
| KR | 20060071291 A | * | 6/2006 | | |
| WO | WO-2021162675 A1 | * | 8/2021 | | |

* cited by examiner

Primary Examiner — Shreyans A Patel
(74) Attorney, Agent, or Firm — Pierce Atwood LLP

(57) ABSTRACT

A speech-processing system receives input data representing text. A first encoder processes segments of the text to determine embedding data representing the text, and a second encoder processes corresponding audio data to determine prosodic data corresponding to the text. The embedding and prosodic data is processed to create output data including a representation of speech corresponding to the text and prosody.

20 Claims, 11 Drawing Sheets

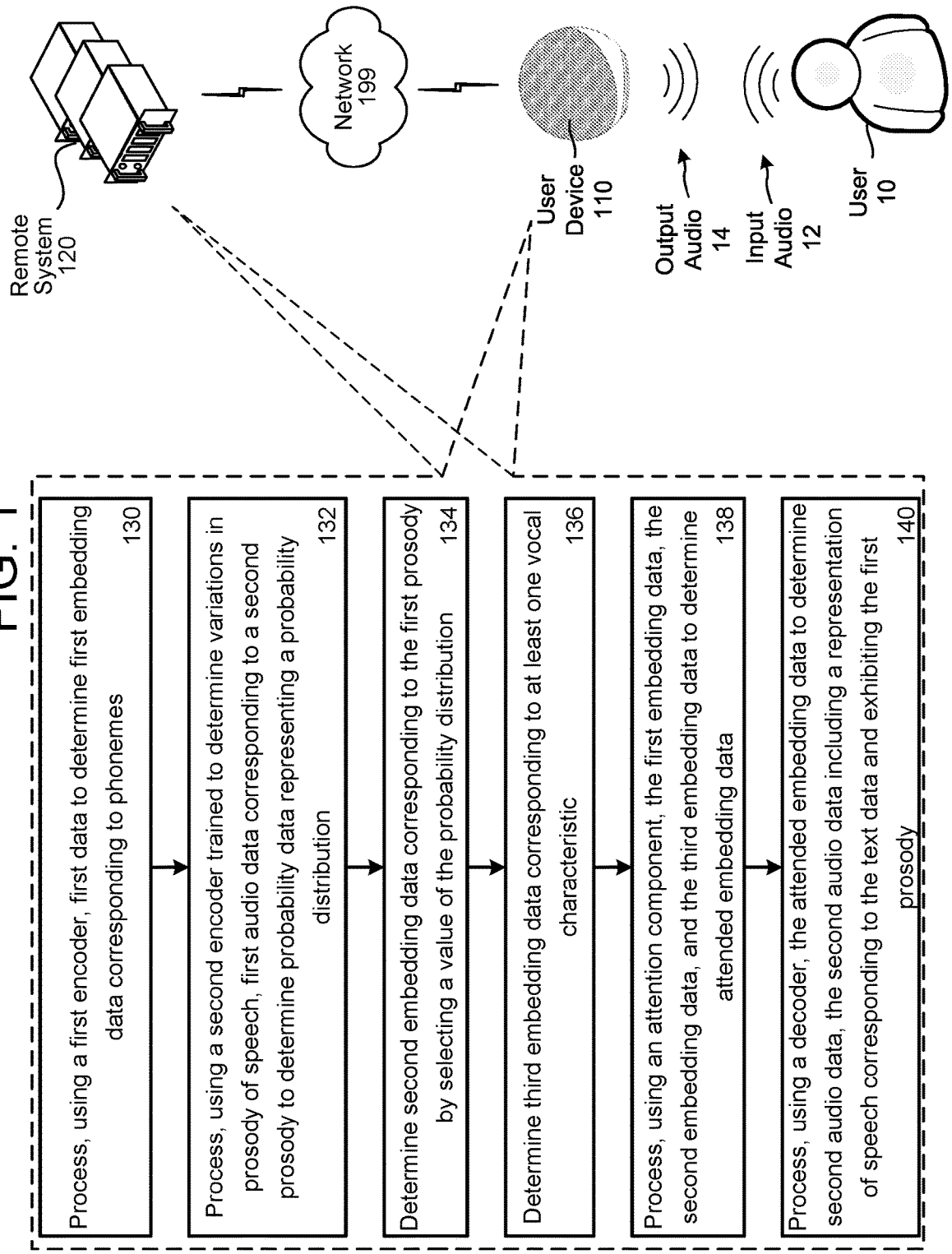

SYNTHETIC SPEECH PROCESSING

BACKGROUND

A speech-processing system includes a speech-synthesis component for processing input data, such as text data, to determine output data that includes a representation of synthetic speech corresponding to the text data. The synthetic speech includes variations in prosody, such as variations in speech rate, emphasis, timbre, or pitch. The prosody of the speech may be learned by processing training audio data and then determined by processing the text data.

BRIEF DESCRIPTION OF DRAWINGS

For a more complete understanding of the present disclosure, reference is now made to the following description taken in conjunction with the accompanying drawings.

FIG. 1 illustrates a method for speech processing according to embodiments of the present disclosure.

DETAILED DESCRIPTION

Figure 2A:
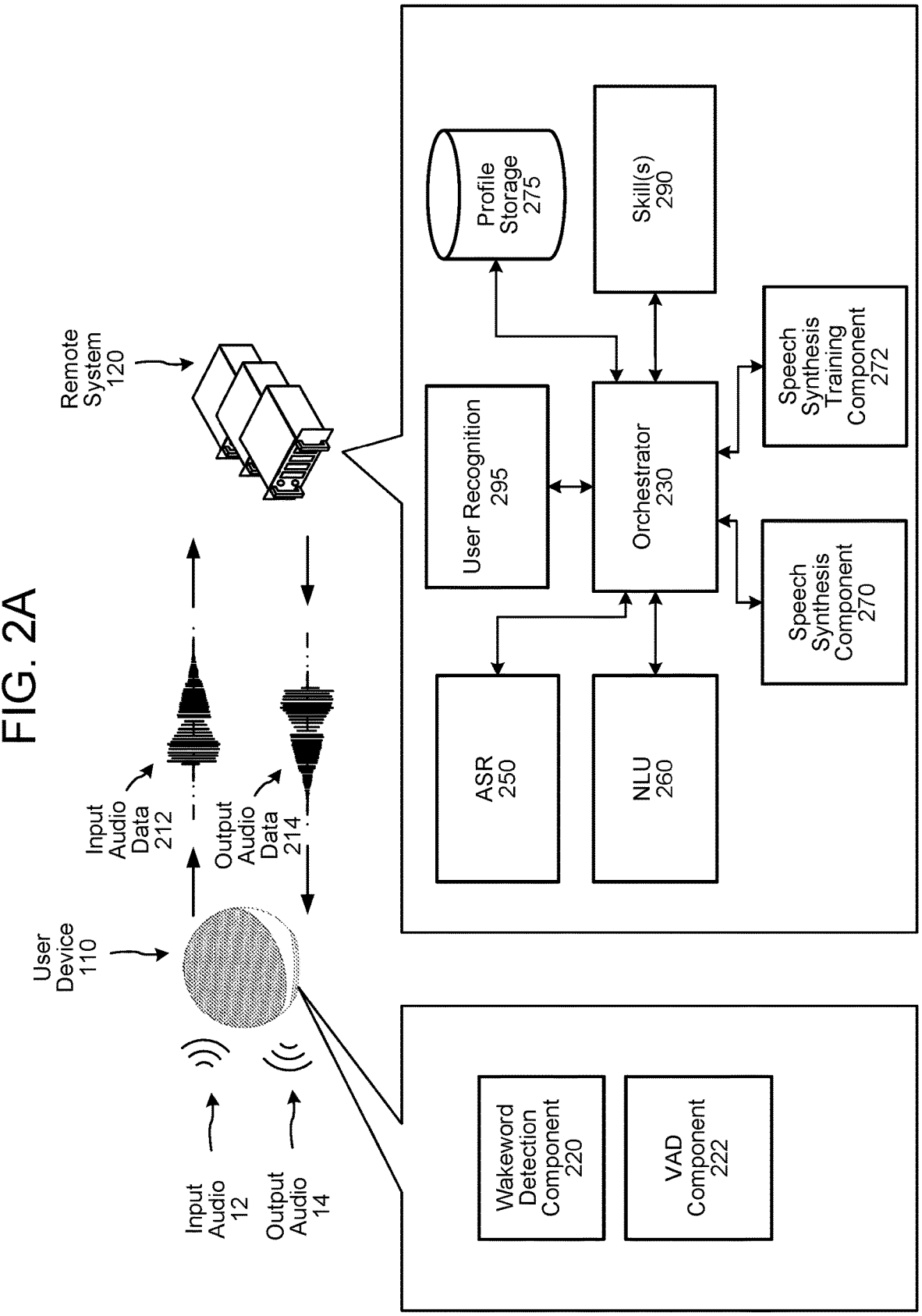
FIG. 2A illustrates components of a user device and of a remote system for speech processing according to embodiments of the present disclosure.

Speech-processing systems may include one or more speech-synthesis components that employ one or more of various techniques to generate sounds to be played, including synthesized speech, from input data (such as text data or other data representing words such as word identifiers, indices or other indicators of words, word embedding data, etc.). The speech-synthesis component may include a phoneme encoder for processing the text data and determining phoneme embedding data representing phonemes of the text data. The speech-synthesis component may also or instead include a speech decoder for processing the phoneme encoded data and the predicted features to determine output data representing the speech.

As the term is used herein, "prosody" refers to the manner in which a given word, sentence, paragraph, or other unit of speech is spoken. Aspects of prosody may include the rate of the speech, the loudness of the speech, how syllables, words, or sentences in the speech are emphasized, when and where pauses in the speech may be inserted, or what emotion (e.g., happy, sad, or anxious) is expressed in the speech. In contrast, "vocal characteristics" refers to those aspects of speech determined by physical factors of a human speaker (or their synthetic equivalents) such as frequency range and timbre.

Aspects of the present disclosure thus relate to synthesizing speech that includes variations in prosodic characteristics, such as speed and pitch, to better make the sounds to be played (e.g., synthesized speech) sound like naturally occurring sounds (e.g., human speech). Training data recorded by human voice actors is altered to change the speed and pitch of their speech; this training data may then be used to train a particular component of a speech-processing system (a variational autoencoder or "VAE") to capture the nature of the variations. The system may then be used to generate synthesized speech that includes aspects of the variations.

For example, a human voice actor may utter a sentence at a particular speed and pitch, but other speeds and pitches may have been used. Altering this utterance to have a spectrum of different speeds, pitches, and/or other such prosodic characteristics may "fill in the blanks" for a wide variety of prosodic variation. A component, such as the VAE described above, may then be trained using this altered training data to thereby learn the spectrum of prosodic variations.

In various embodiments, the speech-processing system is disposed on a single device, such as a user device (e.g., Echo device, phone, tablet, Fire TV device, television, personal computer, etc.). In other embodiments, the speech-processing system is distributed across one or more user devices, such as a smartphone or other smart loudspeaker, and one or more remote systems, such as one or more server, storage, and/or computing machines. The user device may capture audio that includes a representation of human speech and then process the audio data itself and/or transmit the audio data representing the audio to the remote system for further processing. The user device may have, for example, a wakeword-determination component that detects presence of a wakeword in audio and transmits corresponding audio data to the remote system only when the wakeword is detected. As used herein, a "wakeword" is one or more particular words, such as "Alexa," "OK Google," and "Hey Siri," that a user of the user device may utter to cause the user device to begin processing subsequent audio data, which may further include a representation of a command, such as "tell me a funny story" or "read me the news."

The user device and/or remote system may include an automatic speech-recognition (ASR) component that processes the audio data to determine corresponding text data and a natural-language understanding (NLU) component that processes the text data to determine the intent of the user expressed in the text data and thereby determine an appropriate response to the intent. Determination of the response may include processing output of the NLU component using the speech-synthesis component, also referred to as a text-to-speech (TTS) processing component, to determine audio data representing the response. The user device may determine the response using a speech-synthesis component of the user device or the remote system may determine the response using a speech-synthesis component of the remote system and transmit data representing the response to the user device (or other device), which may then output the response. In other embodiments, a user of a user device may wish to transmit audio data for reasons other than ASR/NLU processing, such as one- or two-way audio communication with one or more other user devices or remote systems.

Referring to FIG. 1, a user 10 may provide input data, such as input audio 12, to a voice-controlled user device 110 or a display-enabled user device (e.g., a device featuring at least one display 816, such as a smartphone, tablet, or personal computer). The input data may include one or more user gestures directed to the user device, such as a touchscreen input, mouse click, or key press. The input data may further be or include input audio 12. The user device 110 may output audio 14 corresponding to the output data.

The user device 110 may, in some embodiments, receive input audio 12 and may transduce it (using, e.g., a microphone) into corresponding audio data. As explained in further detail herein, the user device 110 may perform additional speech processing or may send the audio data to a remote system 120 for further audio processing via a network 199. Regardless of whether it is performed by the user device 110 or the remote system 120, an ASR component may process the audio data to determine corresponding text data, and an NLU component may process the text data to determine NLU data such as a domain, intent, or entity associated with the text data.

In various embodiments, the user device 110 and/or remote system 120 receives text data representing words. The words may represent a response to a user command, a news story, a book, an article in a newspaper or a magazine, or any other such input data representing words. The input data may directly represent words of the text, such as ACSII data representing the words, or may be a representation of sub-word or sub-syllable sounds (herein referred to as "phonemes") representing the words. The input data may further include metadata corresponding to the text, such as locations of word boundaries, sentence boundaries, or paragraph boundaries. The user device 110 and/or the remote system 120 processes (130), using a first encoder (e.g., the phoneme encoder 324 of FIG. 3), first data (e.g., data representing text) to determine first embedding data representing the first data. In other words, the first encoder determines a point in an embedding space, as represented by the first embedding data, that represents the phoneme corresponding to the first data.

The user device 110 and/or the remote system 120 processes (132) using a second encoder (e.g., the reference encoder 304) trained to determine variations in prosody of speech corresponding to the text data, first audio data corresponding to a second prosody to determine probability data representing a probability distribution. As explained in greater detail herein, the second encoder may be a variational autoencoder (VAE) trained to specifically model distributions in probability corresponding to alterations of prosodic properties, such as speed and pitch, in training data. The user device 110 and/or the remote system 120 determines (134) second embedding data corresponding to the first prosody by sampling the probability distribution (e.g., determining a value on a probability curve by processing the mean and variance of the curve).

The user device 110 and/or the remote system 120 determines (136) third embedding data corresponding to at least one vocal characteristic (e.g., a speaker ID corresponding to a particular synthetic voice; this data corresponds to vocal characteristics but not to prosodic characteristics. The user device 110 and/or the remote system 120 processes (138), using an attention component, the first embedding data, the second embedding data, and the third embedding data to determine attended embedding data, and processes (140) using a decoder, the attended embedding data to determine second audio data, the second audio data including a representation of speech corresponding to the text data and exhibiting the first prosody.

Figure 2B:
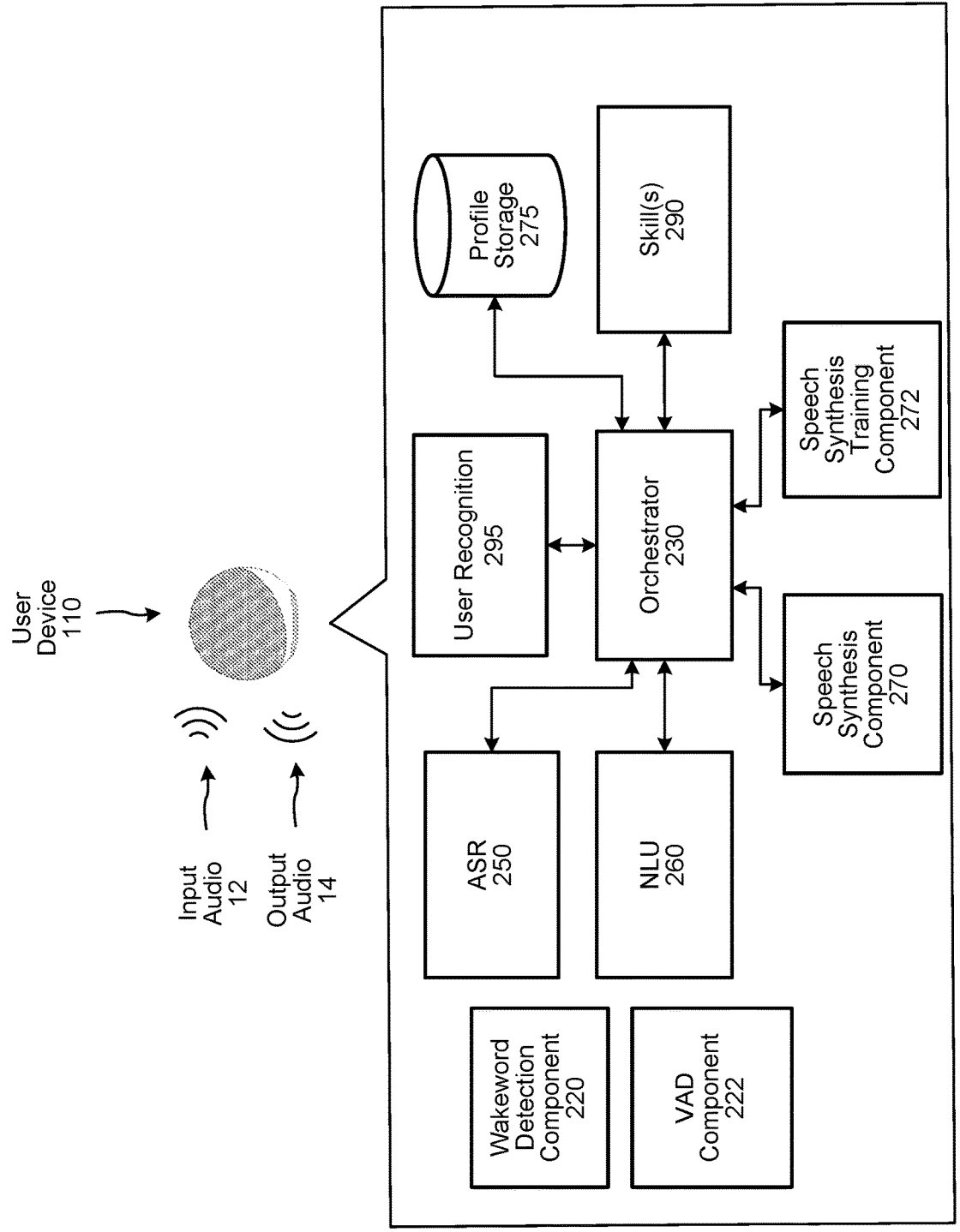
FIG. 2B illustrates components of a user device for speech processing according to embodiments of the present disclosure.

Referring to FIGS. 2A and 2B, a speech-synthesis component 270 may process input text data to determine output audio data representing synthesized speech corresponding to the input text data. Each of the speech-synthesis component 270 and/or the speech-synthesis training component 272 may process training data (e.g., audio data representing speech and text data corresponding to the speech) to train the speech-synthesis component 270. Each of the speech-synthesis component 270 and the speech-synthesis training component 272 are described in greater detail herein.

Referring to FIG. 2A, the user device 110 may capture input audio 12 that includes speech and then either process the audio itself or transmit audio data 212 representing the audio 12 to the remote system 120 for further processing. The remote system 120 may have access to greater computing resources, such as more or faster computer processors, than does the user device, and may thus be able to process the audio data 212 and determine corresponding output data faster than the user device. The user device 110 may include a wakeword-determination component 220 that detects presence of a wakeword in audio and transmits corresponding audio data to the remote system only when (or after) the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system, including the speech-synthesis component 270 and the speech-synthesis training component 272, may disposed wholly on the user device 110. In other embodiments, some additional components, such as an ASR component, are disposed on the user device 110, while other components are disposed on the remote system 120. Any distribution of the components of the speech-processing system of the present disclosure is, thus, within the scope of the present disclosure. The discussion herein thus pertains to both the distribution of components of FIGS. 2A and 2B and also to similar distributions.

The user device 110 or remote system 120 may further include an automatic speech-recognition (ASR) component that processes the audio data to determine corresponding text data and a natural-language understanding (NLU) component that processes the text data to determine the intent of the user expressed in the text data and thereby determine an appropriate response to the intent; the response may include the input text data. The remote system 120 may determine and transmit data representing the response, which may include the output audio data 214, to the user device 110 (or other device), which may then output the response.

Before processing the audio data, the user device 110 may use various techniques to first determine whether the audio data includes a representation of an utterance of the user 10. For example, the user device 110 may use a voice-activity detection (VAD) component 222 to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands or other quantitative aspects. In other examples, the VAD component 222 may be a trained classifier configured to distinguish speech from background noise. The classifier may be a linear classifier, support vector machine, or decision tree. In still other examples, hidden Markov model (HMM) or Gaussian mixture model (GMM) techniques may be applied to compare the audio data to one or more acoustic models in speech storage; the acoustic models may include models corresponding to speech, noise (e.g., environmental noise or background noise), or silence.

If the VAD component 222 is being used and it determines the audio data includes speech, the wakeword-detection component 220 may only then activate to process the audio data to determine if a wakeword is likely represented therein. In other embodiments, the wakeword-detection component 220 may continually process the audio data (in, e.g., a system that does not include a VAD component.) The user device 110 may further include an ASR component for determining text data corresponding to speech represented in the input audio 12 and may send this text data to the remote system 120.

The trained model(s) of the VAD component 222 or wakeword-detection component 220 may be CNNs, RNNs, acoustic models, hidden Markov models (HMMs), or classifiers. These trained models may apply general large-vocabulary continuous speech recognition (LVCSR) systems to decode the audio signals, with wakeword searching conducted in the resulting lattices or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning or smoothing may be applied for decision making.

The remote system 120 may be used for additional audio processing after the user device 110 detects the wakeword or speech, potentially begins processing the audio data with ASR or NLU, or sends corresponding audio data 212. The remote system 120 may, in some circumstances, receive the audio data 212 from the user device 110 (or other devices or systems) and perform speech processing thereon. Each of the components illustrated in FIGS. 2A and 2B may thus be disposed on either the user device 110 or the remote system 120. The remote system 120 may be disposed in a location different from that of the user device 110 (e.g., a cloud server) or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly or via the orchestrator component 230) the text data to a corresponding NLU component 260. The text data output by the ASR component 250 may include a top-scoring hypothesis or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 or the dialog manager component.)

The NLU component 260 may determine an intent (e.g., an action that the user desires the user device 110 or remote system 120 to perform) represented by the text data or pertinent pieces of information in the text data that allow a device (e.g., the device 110, the system 120, etc.) to execute the intent. For example, if the text data corresponds to "play Africa by Toto," the NLU component 260 may determine that a user intended the system to output the song Africa performed by the band Toto, which the NLU component 260 determines is represented by a "play music" intent. The NLU component 260 may further process the speaker identifier 214 to determine the intent or output. For example, if the text data corresponds to "play my favorite Toto song," and if the identifier corresponds to "Speaker A," the NLU component may determine that the favorite Toto song of Speaker A is "Africa."

The user device 110 or remote system 120 may include one or more skills 290. A skill 290 may be software such as an application. That is, the skill 290 may enable the user device 110 or remote system 120 to execute specific functionality in order to provide data or produce some other output requested by the user 10. The user device 110 or remote system 120 may be configured with more than one skill 290.

In some instances, a skill 290 may provide text data, such as the input text data, responsive to received NLU results data. The device 110 or system 120 may include the speech-synthesis component 270 and/or the speech-synthesis training component 272 that generate output audio data from input text data. The speech-synthesis training component 272 may use one of a variety of speech-synthesis techniques. In one method of synthesis called unit selection, the speech-synthesis training component 272 analyzes text data against a database of recorded speech. The speech-synthesis training component 272 selects units of recorded speech matching the text data and concatenates the units together to form output audio data. In another method of synthesis called parametric synthesis, the speech-synthesis training component 272 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data.

The user device 110 and/or remote system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the skill 290.

The user device 110 or remote system 120 may include a profile storage 275. The profile storage 275 may include a variety of information related to individual users or groups of users who interact with the device 110. The profile storage 275 may similarly include information related to individual speakers or groups of speakers that are not necessarily associated with a user account.

Each profile may be associated with a different user or speaker. A profile may be specific to one user or speaker or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile or may be encompassed under another user profile. As illustrated, the profile storage 275 is implemented as part of the remote system 120. The profile storage 275 may, however, may be disposed on the user device 110 or in a different system in communication with the user device 110 or system 120, for example over the network 199. The profile data may be used to inform speech processing.

Each profile may include information indicating various devices, output capabilities of each of the various devices, or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

Figure 3:
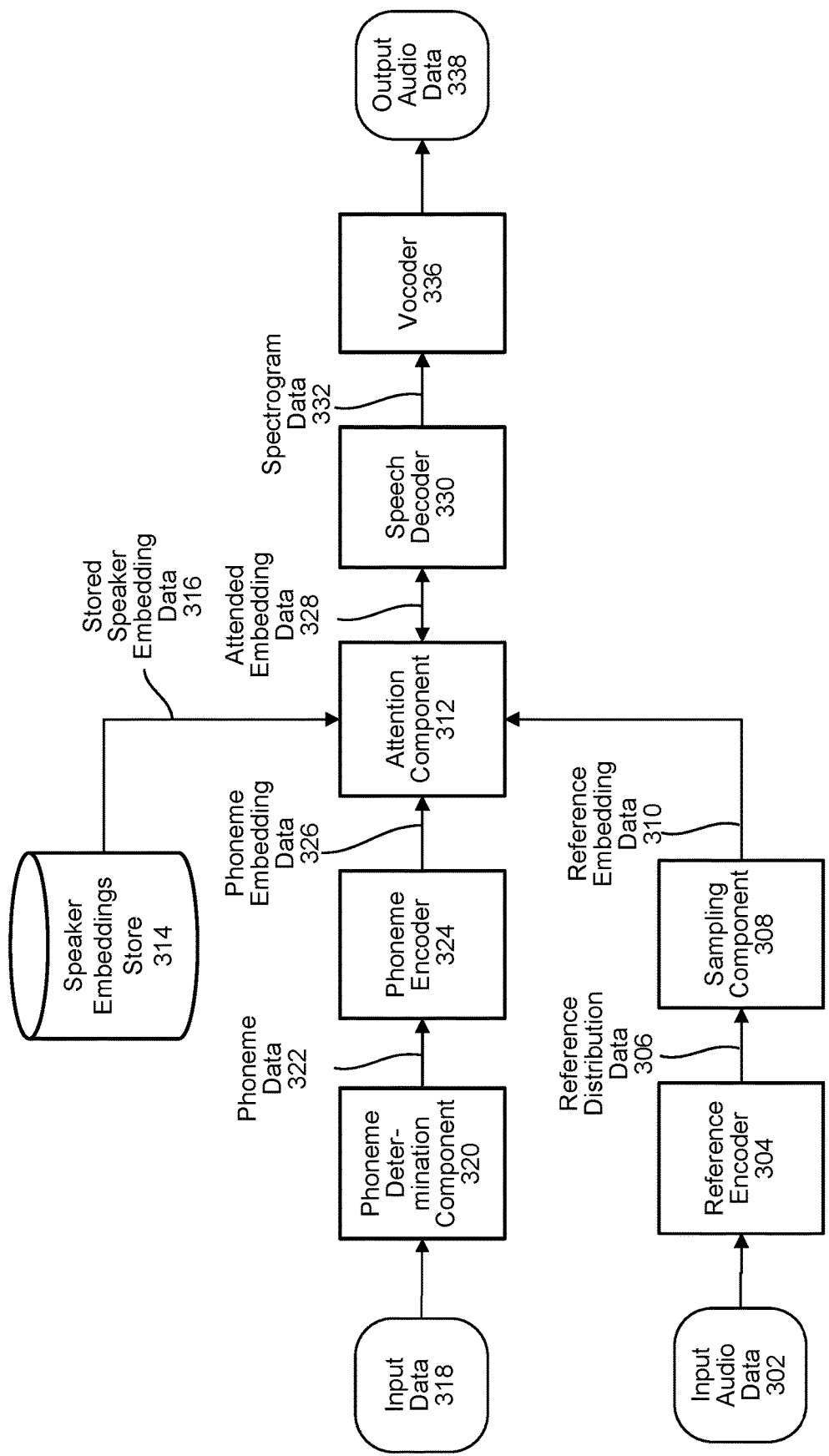
FIG. 3 illustrates components for synthesizing audio data using a speech-synthesis component according to embodiments of the present disclosure.

FIG. 3 illustrates components of a speech-synthesis component 270a according to embodiments of the present disclosure. As described above, the speech-synthesis component 270a processes input data 318, which may be text data) to determine output audio data 338. The speech-synthesis component 270a may further process input audio data 302 using a reference encoder 304 and stored speaker embedding data 316, as described herein.

The input text data 318 may be a representation of text, such as ASCII data, that represents words, sentences, chapters, or other units of text. As mentioned above, the input text data 318 may be determined by a speech app or skill. A phoneme determination component 320 may process the input text data to determine input data 322, such as phoneme data. The phoneme data 322 may represent syllable-level or sub-syllable level units that corresponds to portions of words in the input data 318. The phoneme determination component 320 may be trained model, such as an acoustic model, that processes input text to determine corresponding phonemes.

A phoneme encoder 324 (described in greater detail below with respect to FIG. 5) may process the phoneme data 322 to determine phoneme embedding data 326. The phoneme embedding data 326 may include a number of N-bit vectors (such as 32-bit vectors) that represent one or more phonemes in the phoneme data 322 (and corresponding words in the input data 318). For example, a first sentence in the input data 318 may correspond to a first item of phoneme embedding data 326 that uniquely identifies that sentence, while a second sentence in the input data 318 may correspond to a second item of phoneme embedding data 326 that uniquely identifies that sentence, and so on. The phoneme embedding data 326 may thus correspond to a point in an embedding space corresponding to the input data 318, wherein the embedding space is an N-dimensional space representing all possible words, sentences, paragraphs, chapters, or books. Points near each other in the embedding space may represent similar items of input data 318, while points far from each other in the embedding space may represent dissimilar items of input data 318.

A speaker embedding store 314 may include a number of items of stored speaker embedding data 316. Each item of stored speaker embedding data 316 may be an N-bit vector of values that represent vocal characteristics of a certain human speaker. These vocal characteristics may correspond to physical properties of the human speaker, such as vocal cord length, mouth shape, etc., but the speaker embedding data 316 may not represent (as described in greater detail herein) prosodic characteristics of the speech of the human speaker.

A reference encoder 304 may process input audio data 302 to determine reference distribution data 306. The input audio data 302 may include a representation of speech having a prosody corresponding to the input data 318. In some embodiments, the input audio data 302 may be determined by processing the input data 318 using a neural TTS component, such as a sequence-to-sequence neural TTS component. In other embodiments, the input audio data 302 may be selected based on a property of the input data 318. For example, the NLU component 260 may process the input data 318 to determine a prosodic style associated therewith (e.g., "formal," "informal," or "newscaster"), and the reference encoder 304 may process input audio data 302 associated with the prosodic style. Words represented in the input audio data 302 may or may not match the words represented in the input data 318. Any method of determination of the input audio data 302 is, however, within the scope of the present disclosure.

The reference distribution data 306 may be an N-dimensional set of probability distributions, such as Gaussian distributions, that each represent a likelihood that an item of the input audio data 302 corresponds to a particular reference embedding. The reference distribution data 306 may include two vectors: a first vector representing the mean ($\mu$), and a second vector representing the variance ($\sigma^2$) of an isotropic multi-variate Gaussian distribution. The reference encoder 304 may be trained to determine reference distribution data 306 by varying one or more prosodic properties of training audio data, as explained in greater detail below with reference to FIG. 4.

A sampling component 308 may sample the reference distribution data 306 to determine the reference embedding data 310, which may be, for example, a vector z of dimension 32. "Sampling" may refer to selecting a value of the reference distribution data 306 in accordance with the probability that it represents—e.g., more probable values are selected more often than less probable values. The sampling component 308 may sample the reference distribution data 306 in accordance with the below Equation (1).

$$\mu, \sigma = F_{prosody}(X); z \sim N(\mu, \sigma) \quad (1)$$

In the above Equation (1), X denotes the input audio data 302.

An attention component 312 may process the stored speaker embedding data 316, the reference embedding data 310, and the phoneme embedding data 326 to determine attended embedding data 328. The attention component 312 may include scaling components that may scale each item of the speaker embedding data 316, the reference embedding data 310, and the phoneme embedding data 326 to a greater or lesser degree. Items scaled to a greater degree ("greater attention") may have a greater influence on the output 332 of the speech decoder 330, while items scaled to a lesser degree ("less attention") may have less influence.

The speech decoder 330 may then process the attended embedding data 328 to determine spectrogram data 332, which may include one or more Mel-spectrograms. The speech decoder 330 is explained in greater detail below with reference to FIG. 7. A vocoder 336 may then process the Mel-spectrogram data 332 to determine output audio data 338, which may be a time-domain representation of an audio waveform that corresponds to the input data 318.

Figure 4:
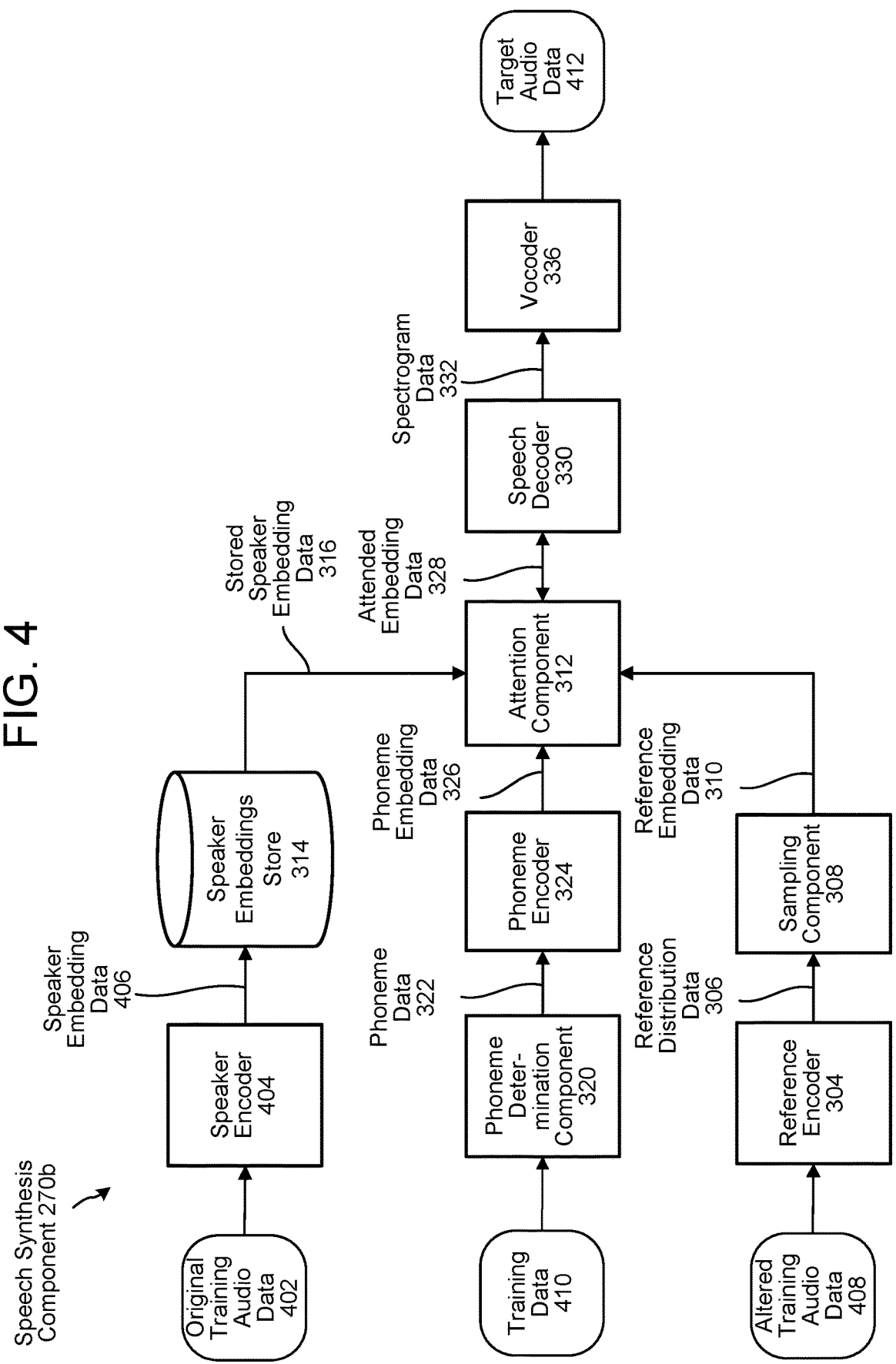
FIG. 4 illustrates components for training a speech-synthesis component according to embodiments of the present disclosure.

FIG. 4 illustrates components for training a speech-synthesis component 270b according to embodiments of the present disclosure. With reference also to FIG. 3, the speech-synthesis component 270b similarly includes a reference encoder 304, a sampling component 308, an attention component 312, a speaker embeddings store 314, a phoneme determination component 320, a phoneme encoder 324, a speech decoder 330, and a vocoder 336 for determining target audio data 412. Each of these components may process data as described above. A speaker encoder 404 may process original training audio data 402 to determine speaker embedding data 406, which may be stored in the speaker embeddings store 314. The original training audio data 402 may include a representation of human speech, such as speech recorded using a voice actor. Training text data 410 may include a representation of the words in the human speech. The speaker encoder 404 may, as described above, process the original training audio data 402 to determine the speaker embedding data 406, which may include a representation of vocal characteristics (but not prosodic characteristics) corresponding to the speech of the human speaker.

The reference encoder 304 may process altered training audio data 408. This altered training audio data 408 may be one or more items of audio data that have had one or more prosodic characteristics of the original training audio data 402 altered in some way. Examples of prosodic characteristics that may be altered include speed and pitch. The altered training audio data 408 may be compared with the target audio data 412, for example by using a loss function, in order to train the various components illustrated in FIG. 4. Multiple, different items of altered training audio data 408 may be processed by the reference encoder for a single item of original training audio data 402; doing so may force the reference encoder 304 to learn the differences in the different items of altered training audio data 408.

The original training audio data 402 may include, for example, audio corresponding to 3000 human speakers, and each human speaker may correspond to an average of 100 utterances. An item of reference embedding data 310 that corresponds to an item of original training audio data 402 may be denoted by $z_0$.

As mentioned above, an item of original training audio data 402 may be altered by, for example, changing a pitch and/or speed of the item. In some embodiments, a number of different alterations (e.g., 10 alterations) are created for each item of original training audio data 402. Each item of altered training audio data 408 may correspond to an alteration in its pitch, denoted by $p_i$, and an alteration in speed, denoted by $p_j$. The values $p_i$ and $p_j$ may be selected randomly from within an acceptable range of values. An item of reference embedding data 310 that corresponds to an item of altered training audio data 408 may be denoted by $z_{i,j}$.

Linear regressors $\beta_i$ and $\beta_j$ may be used to relate the prosody embedding z to $p_i$ and $p_j$ in accordance with Equations (2) and (3), below.

$$p_i = \beta_i \cdot (z_{i,j} - z_0) \quad (2)$$

$$p_j = \beta_j \cdot (z_{i,j} - z_0) \quad (3)$$

The speech-synthesis component 270b may then be trained by optimizing the fined-grained evidence lower bound (ELBO) loss, as defined below in Equation (4).

$$L(p,q) = Eq(z|x)[\log p(X|y,z,E_{spkr}) - \beta D_{KL}(q(z|X) \| P(z)] \quad (4)$$

In the above Equation (4), X refers to the input audio data 302, y refers to the phoneme embedding data 326, z refers to the reference embedding data 310, and $E_{spkr}$ refers to the stored speaker embedding data 316.

For example, as mentioned above, a human voice actor may utter a sentence at a particular speed and pitch, but other speeds and pitches may have been used. Altering this utterance to have a spectrum of different speeds, pitches, and/or other such prosodic characteristics may fill in the blanks for a wide variety of prosodic variation. A component, such as the VAE described above, may then be trained using this altered training data to thereby learn the spectrum of prosodic variations.

Figure 5:
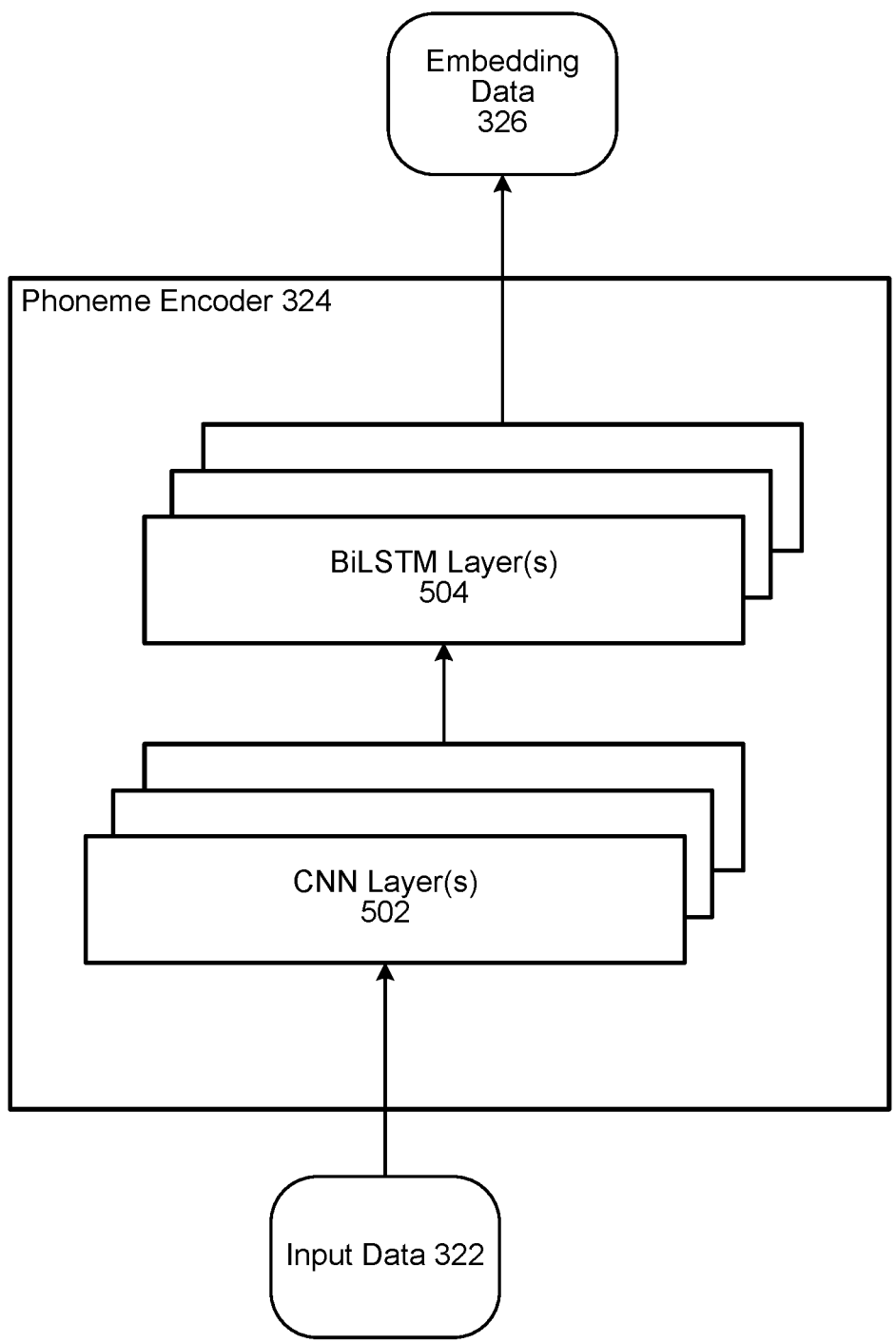
FIG. 5 illustrates components of a first encoder according to embodiments of the present disclosure.

FIG. 5 illustrates components of the phoneme encoder 324 according to embodiments of the present disclosure. One embodiment of the encoder 324 may include one or more convolutional neural network (CNN) layers 502 for processing input data (which may be the input data 322, which may be phoneme data) and one or more uni- or bi-directional long short-term memory (BiLSTM) layers 504 for processing the output(s) of the CNN layers 502 to determine the phoneme embedding data 326. In some embodiments, the encoder 324 includes three CNN layers 502 and one BiLSTM layer 504. The present disclosure is not, however, limited to only these types and numbers of layers, and other deep neural network (DNN) or recurrent neural network (RNN) layers are within its scope.

The speaker encoder 404 (not illustrated) may be similar to the phoneme encoder 324 but may have a gated recurrent unit (GRU) layer in lieu of the LSTM layer. The speaker encoder 404 may further include a first fully-connected bottleneck layer to process the output of the GRU layer and a second fully-connected layer to determine the speaker embedding data 406.

Figure 6:
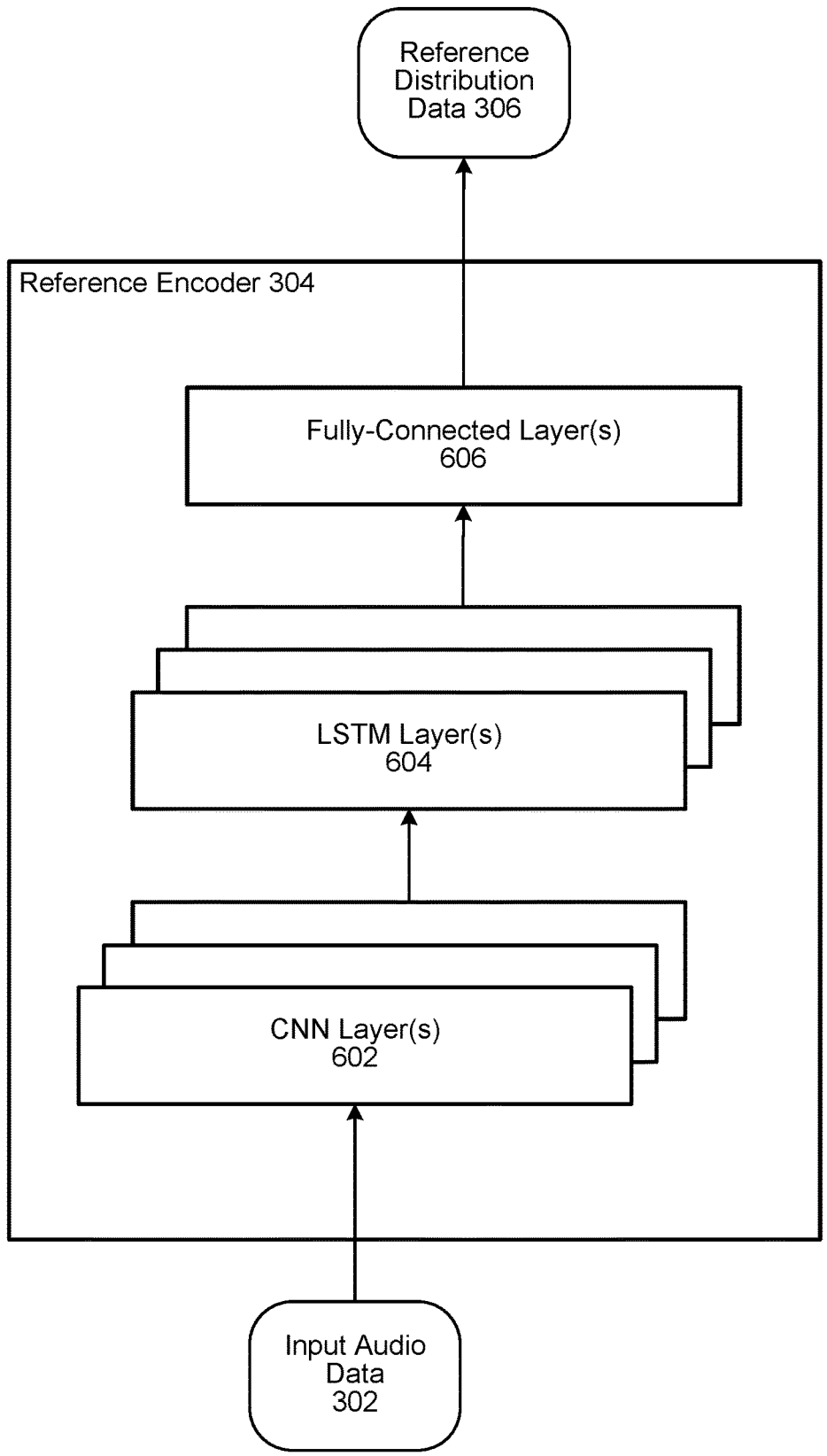
FIG. 6 illustrates components of a second encoder according to embodiments of the present disclosure.

FIG. 6 illustrates components of the reference encoder 304 according to embodiments of the present disclosure. One embodiment of the encoder 304 may include one or more 2D convolutional neural network (CNN) layers 602 for processing input data (which may be the input audio data 302) and one or more unidirectional LSTM layers 604 for processing the output(s) of the CNN layers 602. A final fully-connected layer 606 may determine the reference distribution data 306.

Figure 7:
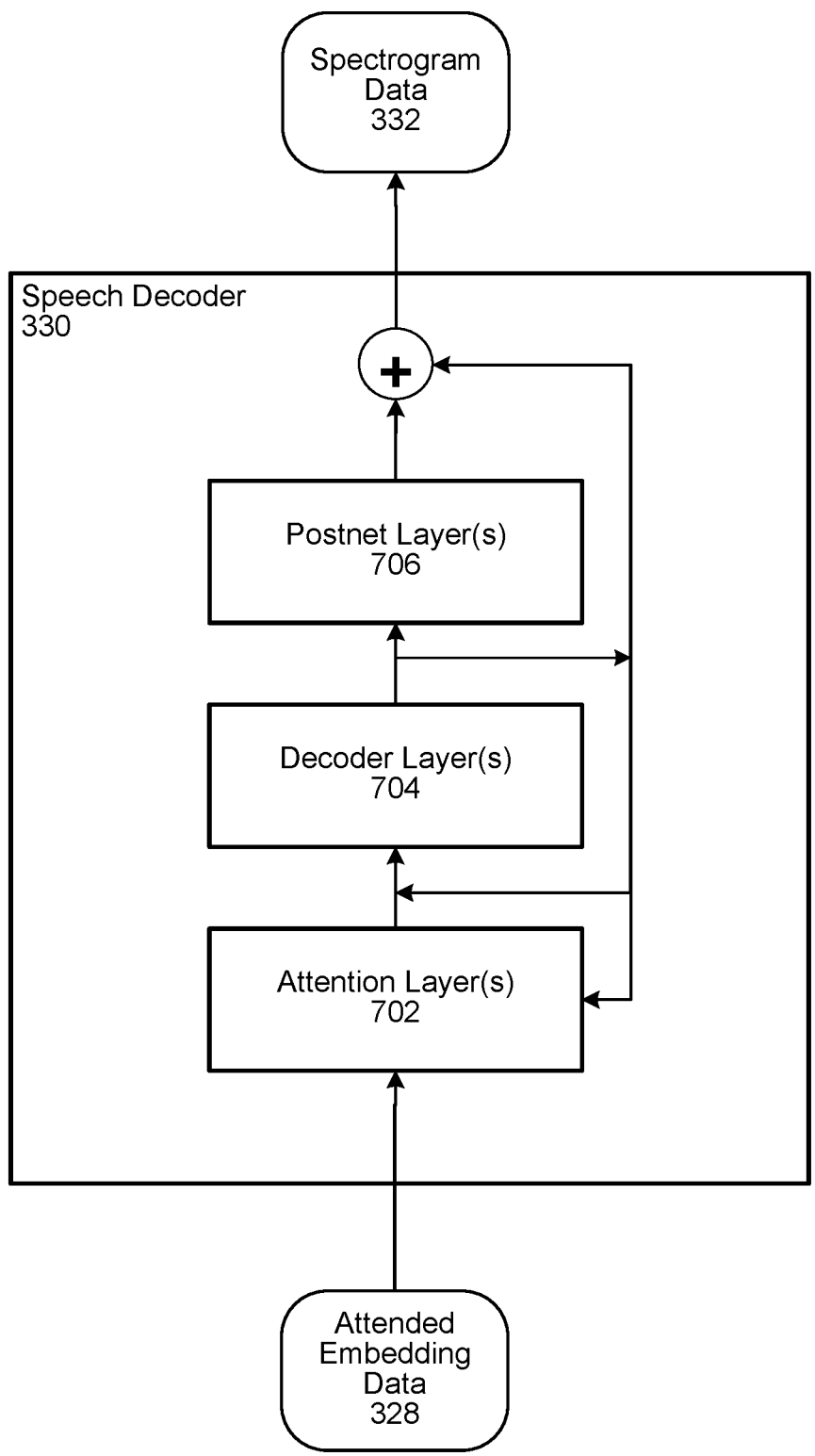
FIG. 7 illustrates components of a decoder according to embodiments of the present disclosure.

FIG. 7 illustrates components of the speech decoder 330 according to embodiments of the present disclosure. The speech decoder 330 may include one or more decoder layer(s) 704, which may include one or more LSTM or BiLSTM layers. One or more attention layer(s) 702 may process input data, such as the embedding data 328, as well as one or more outputs of the decoder layer(s) 704 (e.g., the decoder may be auto-regressive). The attention layer(s) 702 may apply one or more weights to one or more of its inputs to thereby emphasize or "attend to" certain inputs over other inputs. One or more postnet layer(s) 706, such as linear projection, convolutional, and/or activation layers, may process the output(s) of the decoder layer(s) 704 to determine the spectrogram data 332, which may include mel-spectrogram data. A vocoder may process the spectrogram data 332 to determine time-domain audio data.

The decoder layers 704 may include a number of different components according to embodiments of the present disclosure. A BiLSTM layer may process the embedding data 328. One or more CNN layer(s) may process the outputs of the BiLSTM layers, and one or more LSTM layer(s) may process the output(s) of the CNN layers to determine the spectrogram data 332. In some embodiments, the decoder layers 704 include one BiLSTM layer, three CNN layers, and three LSTM layers. In some embodiments, the output of the LSTM layer(s) is further processed by a postnet layer, which may include linear projection, convolutional, or activation layers, to determine the output audio data. The decoder layers 704 may correspond to a non-autoregressive decoder, in which the spectrogram data 332 is determined by processing the embedding data 328. In other embodiments, the decoder layers 704 may correspond to an autoregressive decoder, in which the spectrogram data 332 is determined by processing the embedding data 328 and at least one previously determined item of spectrogram data 332 (in other words, the output data is determined based at least in part on previously generated output data). Any type of decoder 330, including autoregressive and non-autoregressive decoders, is within the scope of the present disclosure.

Figure 8:
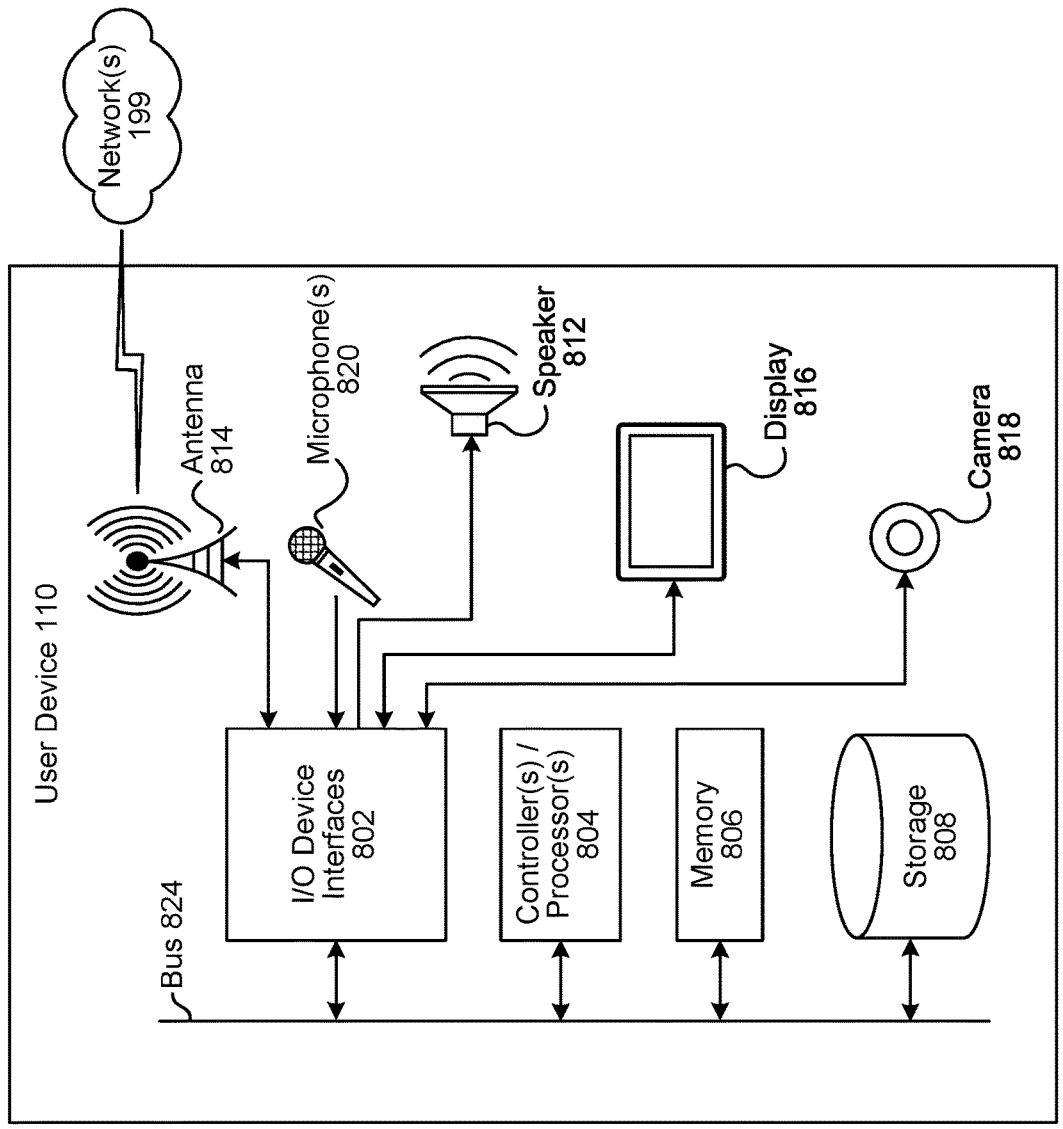
FIG. 8 illustrates components of a user device for speech processing according to embodiments of the present disclosure.
Figure 9:
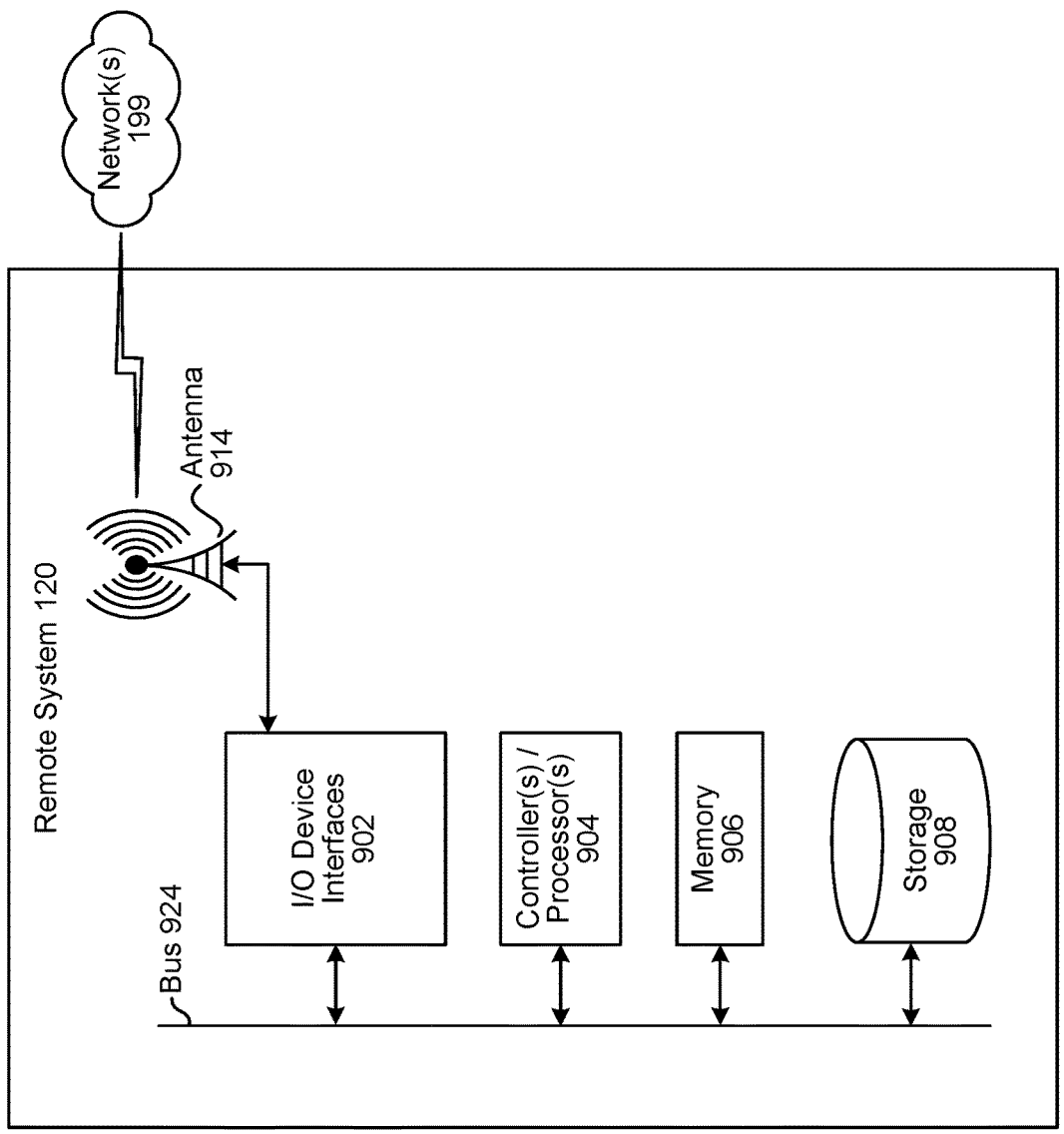
FIG. 9 illustrates components of a remote system for speech processing according to embodiments of the present disclosure.

FIG. 8 is a block diagram conceptually illustrating a user device 110. FIG. 9 is a block diagram conceptually illustrating example components of the remote system 120, which may be one or more servers and which may assist with voice-transfer processing, speech-synthesis processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory or storage (such as a removable memory card, memory key drive, networked storage, etc.) through respective input/output device interfaces (802/902). The device 110 may further include loudspeaker(s) 812, microphone(s) 820, display(s) 816, or camera(s) 818. The remote system 120 may similarly include an antenna(s) 914.

Computer instructions for operating each device/system (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/system (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Figure 10:
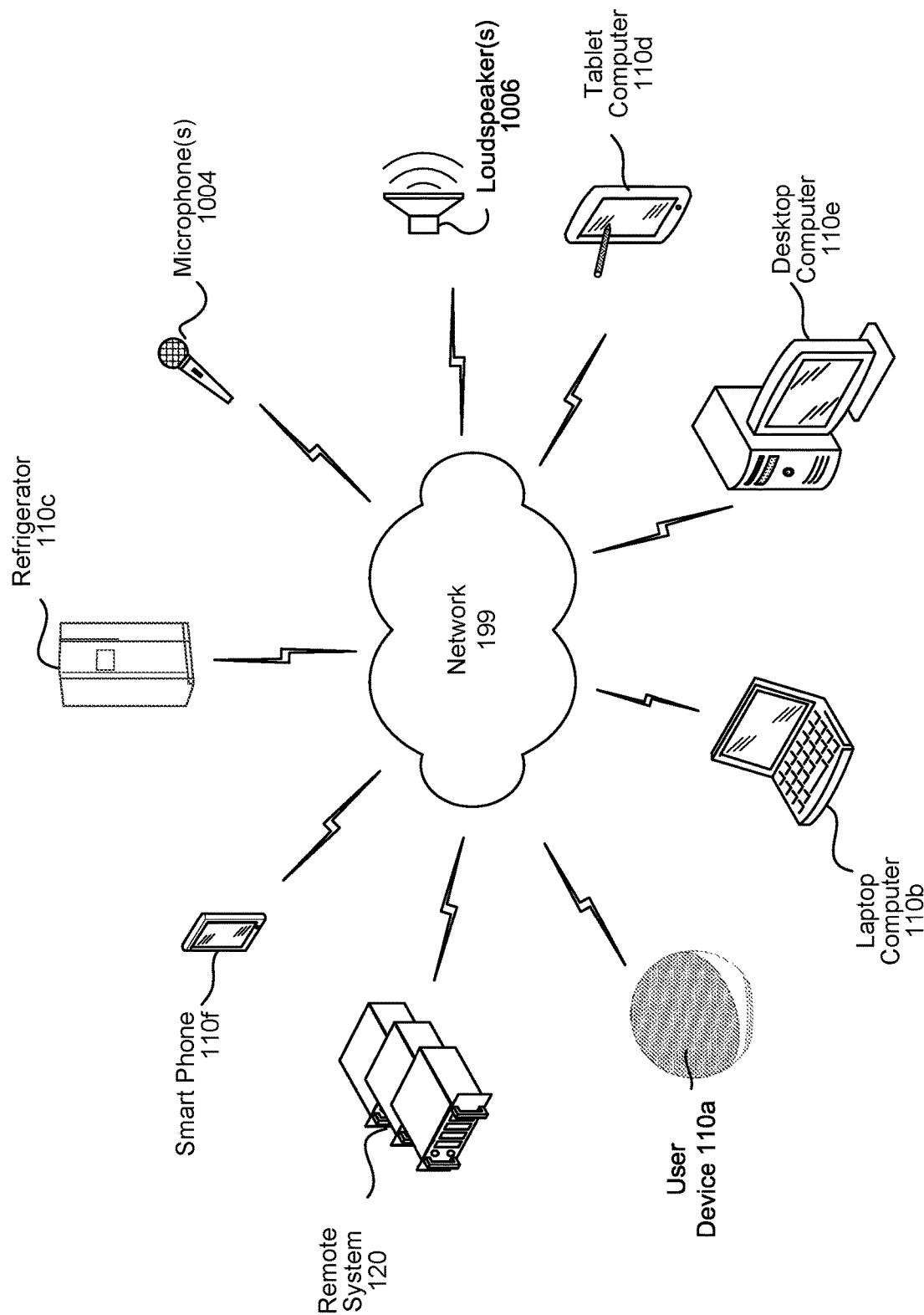
FIG. 10 illustrates a networked computing environment according to embodiments of the present disclosure.

Referring to FIG. 10, the device 110 may include input/output device interfaces 802 that connect to a variety of components such as an audio output component (e.g., a microphone 1004 or a loudspeaker 1006), a wired headset, or a wireless headset (not illustrated), or other component capable of outputting audio. The device 110 may also include an audio capture component. The audio capture component may be, for example, the microphone 820 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 814, the input/output device interfaces 802 may connect to one or more networks 199 via a wireless local area network (WLAN) (such as WiFi) radio, Bluetooth, or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical systems in a collection of systems or other components.

The components of the device(s) 110 or the system 120 may include their own dedicated processors, memory, or storage. Alternatively, one or more of the components of the device(s) 110 or the system 120 may utilize the I/O interfaces (802/902), processor(s) (804/904), memory (806/906), or storage (808/908) of the device(s) 110 or system 120.

As noted above, multiple devices may be employed in a single system. In such a multi-device system, each of the devices may include different components for performing different aspects of the system's processing. The multiple devices may include overlapping components. The components of the device 110 or the system 120, as described herein, are illustrative, and may be located as a stand-alone device or may be included, in whole or in part, as a component of a larger device or system.

The network 199 may further connect a voice-controlled user device 110a, a tablet computer 110d, a smart phone 110f, a refrigerator 110c, a desktop computer 110e, or a laptop computer 110b through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk or other media. In addition, components of one or more of the components and engines may be implemented as in firmware or hardware, such as the acoustic front end, which comprise among other things, analog or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating synthesizing speech, the method comprising:
receiving first data representing text;
processing the first data to determine phoneme data representing sounds to be played corresponding to the text;
determining first audio data representing speech corresponding to the first data, the first audio data corresponding to a first prosody;

processing, using a phoneme encoder, the phoneme data to determine phoneme embedding data;
processing the first audio data, using a reference encoder trained to generate a second prosody corresponding to the text, to determine probability data representing a probability distribution;
determining second embedding data corresponding to the second prosody by selecting a value of the probability data;
determining third embedding data corresponding to at least one vocal characteristic;
processing, using an attention component, the phoneme embedding data, the second embedding data, and the third embedding data to determine attended embedding data; and
processing, using a decoder, the attended embedding data to determine second audio data, the second audio data including a representation of speech corresponding to the first data and exhibiting the second prosody.

2. The computer-implemented method of claim 1, further comprising:
determining, using a text-to-speech system, that the first data corresponds to the first prosody; and
processing the first data, using the text-to-speech system, to determine the first audio data.

3. A computer-implemented method comprising:
processing, using a first encoder, first data to determine first embedding data corresponding to speech to be synthesized;
processing, using a second encoder trained to output variations in prosody of speech, first audio data corresponding to a first prosody to determine probability data representing variations in prosody;
determining second embedding data corresponding to a second prosody by selecting a value of the probability data, the value corresponding to the second prosody;
determining third embedding data corresponding to at least one vocal characteristic;
processing, using an attention component, the first embedding data, the second embedding data, and the third embedding data to determine second data; and
processing, using a decoder, the second data to determine second audio data, the second audio data including a representation of speech corresponding to the first data exhibiting the second prosody.

4. The computer-implemented method of claim 3, further comprising:
determining that the first data corresponds to the second prosody; and
based at least in part on determining that the first data corresponds to the second prosody, selecting the first audio data.

5. The computer-implemented method of claim 3, further comprising:
processing the first data with a text-to-speech system to determine the first audio data.

6. The computer-implemented method of claim 3, wherein:
determining the probability data comprises determining a mean of a probability distribution and a variance of the probability distribution.

7. The computer-implemented method of claim 6, wherein:
selecting the value comprises sampling the probability distribution by processing the mean and the variance.

8. The computer-implemented method of claim 3, wherein the second encoder is configured to determine variations in prosody corresponding to a probability distribution.

9. The computer-implemented method of claim 8, wherein the variations in prosody represent a variation in speed of speech and a variation in pitch of an utterance.

10. The computer-implemented method of claim 9, wherein the variations in prosody represent a number of sets of variations in the speed and in the pitch of the utterance.

11. The computer-implemented method of claim 3, further comprising:
determining that the third embedding data corresponds to the first data.

12. A system comprising:
at least one processor; and
at least one memory including instructions that, when executed by the at least one processor, cause the system to:
process, using a first encoder, first data to determine first embedding data corresponding to speech to be synthesized;
process, using a second encoder trained to predict variations in prosody of speech, first audio data corresponding to a first prosody to determine probability data representing of the variations in the prosody;
determine second embedding data corresponding to a second prosody by selecting a value of the probability data, the value corresponding to the second prosody;
determine third embedding data corresponding to at least one vocal characteristic;
process, using an attention component, the first embedding data, the second embedding data, and the third embedding data to determine second data; and
process, using a decoder, the second data to determine second audio data, the second audio data including a representation of speech corresponding to the first data and exhibiting the second prosody.

13. The system of claim 12, wherein the at least one memory includes further instructions that, when executed by the at least one processor, further cause the system to:
process the first data with a text-to-speech system to determine the first audio data.

14. The system of claim 12, wherein the at least one memory includes further instructions that, when executed by the at least one processor, further cause the system to:
determine that the first data corresponds to the second prosody; and
based at least in part on determining that the first data corresponds to the second prosody, select the first audio data.

15. The system of claim 12, wherein the instructions that cause the system to determine the probability data comprise instructions to determine a mean corresponding to a probability distribution and a variance corresponding to the probability distribution.

16. The system of claim 15, wherein the instructions that cause the system to select the value comprise instructions to:
sample the probability distribution by processing the mean and the variance.

17. The system of claim 12, wherein the second encoder is configured to determine variations in prosody corresponding to a probability distribution.

18. The system of claim 17, wherein the variations in prosody represent a variation in speed of speech and a variation in pitch of an utterance.

19. The system of claim 18, wherein the variations in prosody represent a number of sets of variations in the speed and in the pitch of the utterance.

20. The system of claim 12, wherein the at least one memory includes further instructions that, when executed by the at least one processor, further cause the system to:
   determining that the third embedding data corresponds to the first data.

* * * * *